Oct. 1, 1957  A. G. BODINE, JR  2,807,931
CONTROL OF COMBUSTION INSTABILITY IN JET ENGINES
Filed June 16, 1951  2 Sheets-Sheet 1
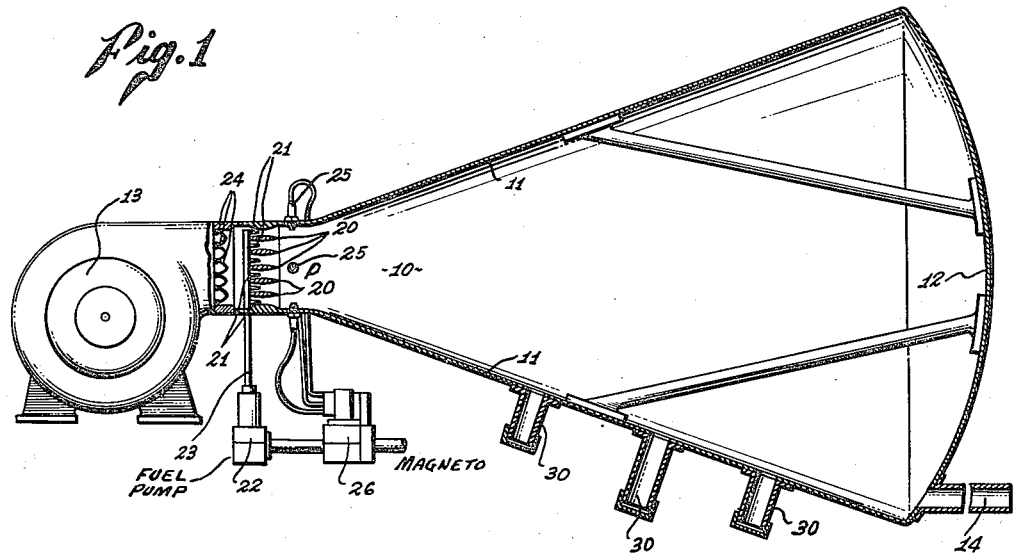
Fig. 1
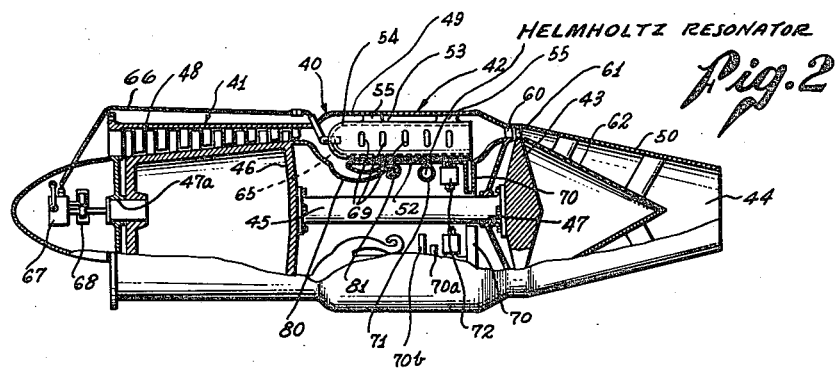
Fig. 2
Fig. 3
INVENTOR.
ALBERT G. BODINE JR.
BY
Attorney

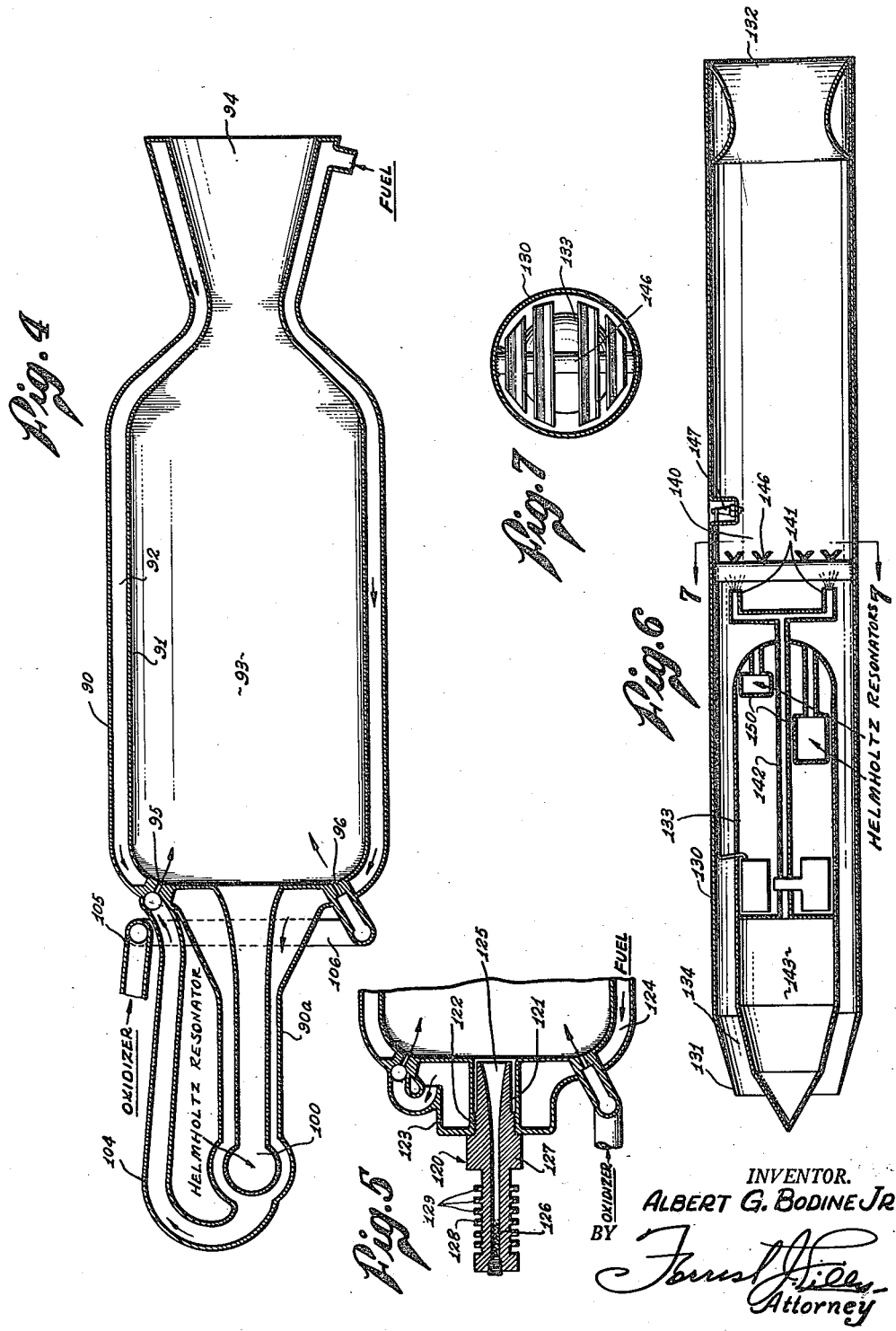

United States Patent Office 2,807,931
Patented Oct. 1, 1957

2,807,931

CONTROL OF COMBUSTION INSTABILITY IN JET ENGINES

Albert G. Bodine, Jr., Van Nuys, Calif.

Application June 16, 1951, Serial No. 231,954

10 Claims. (Cl. 60—35.6)

This invention relates generally to the control of combustion instability in jet engines and to methods of and means for suppressing irregular fuel combustion and detonation in jet engine combustion chambers. The invention in its broad sense is applicable to various types of jet engines, including gas turbines, e. g., turbojet engines, ram-jets, and rockets. The present application is a continuation-in-part of my application entitled Resonant Gas Compressor and Method, filed April 23, 1945, Serial No. 589,753, issued January 8, 1952, as Patent No. 2,581,902. This application is also a continuation-in-part of my application entitled Engine Detonation Control by Acoustic Methods and Apparatus, Ser. No. 234,688, filed July 2, 1951, now Patent No. 2,573,536.

The phenomena here dealt with may be classed as a form of "detonation." That is to say, it is quite common to use the term detonation when discussing phenomena involved in rough or irregular combustion, sudden pressure peaks, and the like, in connection with combustion in an internal combustion chamber. This combustion irregularity, instability, or "detonation," is susceptible to control and management by the provisions of the present invention. The term combustion as used herein is also broad enough to cover the type of chemical reaction produced in rocket type jet engines, where such a fuel as aniline is oxidized by such an agent as nitric acid in order to generate combustion gases for jet discharge. In this type of combustion there is an irregularity of the gas generating chemical reactions which is also capable of being managed by the provisions of the present invention. I have found that many of the phenomena involved with unsteady combustion are of acoustic origin. That is to say, I have found that detonation and similar combustion rate irregularities involve acoustic performances.

There is a degree of cooperation between the acoustic properties of a cavity or chamber and a combustion reaction taking place therein. I have found in my research on this subject that sound waves in a combustion chamber will literally turn a fire on and off. Apparently this is due to fluctuations in air and fuel density. Again, I have found that periodic sound-wave-controlled combustion can actually generate or regenerate sound waves. By regeneration, I refer to the action involved where sound waves affect combustion, and the resulting combustion irregularity reinforces the original sound wave action, causing a "regenerative" build up of both the sound waves and the combustion irregularity. It can be said, therefore, that under certain conditions sound waves in a combustion chamber cause periodic combustion and periodic combustion in turn causes sound waves. I believe this to be a very broad and novel concept.

I have further postulated the theory that combustion irregularities and detonation occurring in combustion chambers are of acoustic origin, and I have succeeded in stabilizing combustion and substantially reducing detonation by acoustic wave attenuation procedures. The novel application of acoustic attenuation to offensive sound wave frequencies connected with combustion is the key to my invention.

Briefly stated, the burning irregularities in jet engine combustion chambers, which it is my purpose to control, consist in sudden pressure and temperature peaking in the course of normal combustion, sharply, if momentarily, increasing the rate of fuel burning, and setting up strong compression waves throughout the combustion chamber. These waves I have found to be high energy sound waves, and I have further found that they develop in certain ascertainable frequency bands, and in certain reasonably well defined wave patterns including regions of high and low impedance. I have also found that these wave patterns are largely determined by the structural dimensions of the cavity. The problem presented by this combustion instability is very serious, the phenomena showing up in the form of many kinds of undesirable performance such as undue heating of the combustion duct walls, even to the point of melting, severe vibration of mechanical structure, after-burning or delayed completion of combustion, and severe "chugging" to the extent of impairing nozzle discharge efficiency and in some cases causing actual blowout of the combustion process at high altitudes. The heating problem is often particularly acute, since the particles of heated combustion gas under the influence of sound wave patterns oscillate to and from at the sonic frequency, and where these gas particles scrub against the duct walls, otherwise heat-insulating boundary layers of relatively stagnant gas are scrubbed away, with the result of greatly increased heat transfer to the walls. In addition, the oscillation superimposed on the otherwise steady travel of the gases through the duct multiplies the velocity and integrated length of gas particle travel relative to the duct walls, further increasing the rate of heat transfer to the walls.

An object of the present invention is accordingly the provision of acoustic methods and means for controlling and correcting combustion irregularities in jet engine combustion chambers.

The invention provides acoustic attenuative measures and means which are installed in the combustion chambers of jet engines, particularly in certain critical locations in the combustion chambers of jet engines where their effect on the sound waves is the greatest. In most cases, these locations are regions of high acoustic impedance, acoustic impedance in combustion being understood to be the ratio of cyclic gas pressure to cyclic gas particle velocity. Regions of this acoustic impedance are accordingly those regions where the cyclic pressure in the combination gases attains high values, but where to and fro gas particle velocity owing to the sound waves is at a relatively small value. These regions are easily located in practice by use of a conventional probe microphone, which may be extended into the combustion chamber. Such a microphone consists of a long slender tube, made up of heat resistant metal, and a microphone at its handle end. Such an instrument readily locates the high impedance points where the sound wave attenuators may most advantageously be installed. The use of these attenuators, several forms of which will later be explained, cancels or absorbs the offensive sound wave, or in some cases shifts it to a less offensive frequency, and the external signs or problems of combustion irregularity are reduced accordingly.

At the same time, I have found combustion to be aided by the presence of sound waves, and the complete and utter destruction of all sound wave action could also seriously weaken or even stop the combustion. Accordingly, my invention does not contemplate the complete destruction of sound wave actions within the combustion chamber, but only its attenuation to a sufficient degree to avoid or control the deleterious effects mentioned hereinabove. Again, the sound wave set up in the combustion may be in any of all of several modes, viz., longitudinal of the chamber, circumferential, or radial, and not all of these may be harmful. For example, the longitudinal and circumferential modes may be strongly contributory to heating, while the radial may not; and if wall heating is the primary problem, the preferred procedure is to attenuate the longitudinal and circumferential modes (by locating their high impedance regions and installing thereat wave attenuators responsive to their characteristic frequencies), while leaving the radial components to operate because of their beneficial effect on combustion.

The invention will be understood from the following detailed description of certain present illustrative embodiments thereof, reference for this purpose being had to the accompanying drawings, in which:

Figure 1 is a longitudinal sectional view of a jet engine in accordance with the invention;

Figure 2 is an elevational view, partly in longitudinal section, of a turbo-jet engine embodying features of the present invention;

Figure 3 is an enlarged detail showing an acoustic attenuator of Figure 2;

Figure 4 is a longitudinal sectional view of a rocket-type jet engine embodying the present invention;

Figure 5 is a view similar to a portion of Figure 4 showing a modification;

Figure 6 is a longitudinal sectional view of a ram-jet engine embodying the present invention; and Figure 7 is a rear view of the flame holding grille at 7—7 of Figure 6.

Referring first to the engine shown in Figure 1, a combustion chamber 10, in this instance of conical form, has rigid conical side wall 11 and spherical reflecting wall 12 at its large end. Air is delivered to the small end of the cone from a blower 13, and exhaust is by way of a pipe 14 leading through end wall 12. The engine of Figure 1 may be considered as a jet propulsion engine, in which case pipe 14 will be in the nature of a jet discharge nozzle, though it may also be employed as a gas compressor, in which case discharge pipe 14 becomes simply the pressure fluid delivery pipe. In the case of gas compressor usage, discharge pipe 14 can be sufficiently small in cross-sectional area so as to restrict discharge flow and thereby maintain a back pressure. Or, if desired, pipe 14 can be connected to a conventional back pressure relief valve in the piping system of the load.

At the small end of the cone is a plurality of baffles 20 of air foil section, and a plurality of fuel nozzles 21 discharge between these baffles 20. The fuel nozzles are supplied with fuel from fuel pump 22 by way of fuel line 23. A plurality of reed-type flap valves 24 are shown between blower 13 and the fuel nozzles, and control the delivery of air from blower 13 into the cone. If the pressure within the small end of the cone falls below that on the blower side of the valves 24, the valve flaps open to permit passage of fluid between them. Reverse flow is checked when the flaps assume a closed position, which they are biased to do normally.

The fuel and air charge may be ignited by a spark plug 25 excited by magneto 26. Explosion of the fuel-air charge at the combustion region P (which is at the "focus" of the spherical reflecting wall 12) launches a wave of compression in the gases contained inside the cone, which wave travels the length of the cone and is then reflected by wall 12 to return in the reverse direction, the energy density increasing to a high value as the wave converges to a focus at P. By timing the fuel supply and magneto in proper relation to the dimensions of the cone for resonant operation, a standing wave will be established in the cone, with a pressure antinode P at the fuel combustion region in the neck of the cone.

Alternate periods of compression and rarefaction accordingly occur at P. When a rarefaction period begins, the reed valves 24 open to admit air, which flows between baffles 20 and vaporizes fuel from nozzles 21. The occurrence of the rarefaction at zone P sufficiently lowers pressure in the region of the fuel nozzles to permit a discharge of fuel under pressure supplied by fuel pump 22.

As the rarefaction period draws to a close and the compression half of the cycle begins, the rising pressure closes the reed valves and stops or reduces the flow of fuel. The fuel and air charges are ignited by the spark plug in time proper to reinforce the compression peak of the standing wave. In some instances this periodic combustion will take place without the spark plug acting. The fire almost goes out on rarefaction, and reactivates on the pressure build-up phase.

Air taken into the apparatus by way of blower 13 is, as earlier stated, discharged from delivery pipe 14, and this jet discharge creates a thrust, which is available for propulsion purposes, while if the apparatus is intended for gas compression only, pressurized gas is delivered from the delivery pipe into the flow restrictive load, whatever it may be.

In the operation of such an apparatus, burning irregularities often occur, and these are intimately related to acoustic wave patterns created within the combustion chamber 10. Correction is obtained by destruction or attenuation of certain of these wave patterns. Often these wave patterns are harmonics of the fundamental wave frequency characteristic of the apparatus, and their destruction or amelioration is best obtained by interfering with such harmonics at their high impedance regions (pressure anti-nodes) within the combustion chamber. The wave attenuators employed in the engine of Figure 1 consist of "spoiler" tubes 30, which open into the combustion chamber, but are closed at their outer ends. These spoiler tubes are of lengths approximating $\lambda/4$ for the harmonic frequencies to be cancelled, where $\lambda$ is the wave length in the hot combustion gases of the harmonic frequency wave. As already indicated, these spoiler tubes preferably open into a region of high acoustic impedance, i. e., pressure anti-nodes, for the undesirable harmonic. They function to supply to the high impedance region reflected waves which are 180° out of phase with the received harmonic wave, with the result that the harmonic is largely cancelled. These spoiler tubes thus provide regions of low acoustic impedance adjacent regions of high acoustic impedance to effect cancellation of unwanted wave frequencies. The spoiler tubes also function to absorb the energy of the sound wave by reason of turbulence and friction losses caused by the high amplitude wave action in the tubes when they resonate. The deleterious harmonic frequency wave patterns are accordingly weakened or eliminated, and their effect on the combustion process is thereby reduced commensurately. The engine can then work efficiently with a simple pressure cycle (fundamental frequency only), and with substantial pressure changes occurring only at the reflector and at the focus.

Figure 2 shows the invention incorporated in a gas turbine, in this instance a turbo-jet, though it will be evident that the invention is also applicable to any type of gas turbine, including those for generating shaft horsepower. In Figure 2, which is diagrammatic in nature, the turbo-jet engine is designated generally by numeral 40, and this engine is of a conventional type including axial flow compressor 41, burner section 42, turbine wheel 43, and jet discharge orifice 44, turbine rotor 43 being on shaft 45 which drives the rotor 46 of compressor 41. The compressor and turbine rotate as a unit, using bearings 47 and 47a. The turbine has an external shell 48, open at the forward end for air intake to compressor 41, and having an enlarged intermediate portion 49 at the burner section, and a converging rearward section 50 terminating in orifice 44. Inside of shell portion 49 is an inner burner wall 52, and an annular combustion chamber space or duct 53 is formed between burner section wall 49 and inner wall 52. Within the annular space 53 are burners 54 comprising cylindrical tubes closed at their forward ends and open toward the rear, these being suitably supported, as by means of webs 55. It will be seen that the air discharged rearwardly from compressor 41 enters the forward end of duct 53, and that the air flow, including products of combustion from the burner tubes, leaves the rearward end of the duct 53 through stationary turbine blades 60 to impinge on turbine rotor blades 61, being thence discharged rearwardly between inner tail cone 62 and convergent shell section 50 to be discharged finally at orifice 44.

A fuel nozzle 65 discharges fuel into the head end of burner 54, the fuel being supplied by fuel line 66 leading from fuel control unit 67 and fuel pump 68. Air enters burner 54 through a series of intake ports 69. Combustion of the fuel and air mixture within burner 54 results in the discharge of high pressure combustion gases in a rearward direction to drive turbine rotor 43, and eventually to be jet-discharged at 44.

It will be seen that combustion takes place primarily within the burners 54. The main gas flow, of course, takes place in the duct space 54 around the burners, and this duct space is not normally thought of as a part of the combustion chamber. However, I have found that, for the purposes of the present invention, the duct space 53 around the burners is to be considered a part of the combustion chamber, for the reason that the combustion chamber space inside the burner tubes is in immediate communication with the space 53 surrounding the burner tubes, with the result that the two spaces are intimately associated acoustically and must be considered together. Accordingly, for the purpose of the present invention, the combustion chamber space is to be considered as including not only the space within the burner tubes 54, but also the duct space 53 around said tubes and communicating therewith through the open ends of the tubes.

In the operation of such a turbo-jet engine as described immediately above, combustion irregularities are commonly encountered, and are found to be accompanied by unexpected heating of the combustion chamber walls, and by mechanical vibration, and sometimes blowout of the fire. In accordance with the invention, I incorporate in connection with the combustion chamber space certain sound wave attenuative devices which curtail or eliminate acoustic wave phenomena or patterns within the combustion chamber, and thereby eliminate or ameliorate combustion irregularities of acoustic origin. In accordance with the principles of the invention, these are best, and preferably, located in carefully ascertained high impedance regions of the combustion chamber space for unwanted modes of sound wave action. Of course, in less refined practice of the invention, they may be located indiscriminately in substantial number throughout the suspected areas of the combustion space, with the result that those located in the higher impedance regions of the combustion chamber space will be effective in curtailing sound wave patterns. The most important consideration is the essential response of these devices to the undesired wave length, or frequency.

In Figure 2 I have shown, for illustrative purposes, several forms of sound wave attenuating device, including quarter-wave spoiler tubes, Helmholtz resonators, fibrous absorber devices, and trumpet-type attenuators, these being, for illustrative purposes, sunk into or through the inner duct wall 52, and arranged to communicate with the space 53. They may also, or alternatively, be located elsewhere in the combustion chamber region, or totally within the chamber itself, but are most conveniently accommodated inside the wall 52. By preliminary test probing, high impedance regions along and around this wall 52 for harmful or unwanted sound wave modes or components are ascertained, and the attenuator devices, having the necessary frequency response, are then installed at such locations. They are shown in Figure 2 in several forms and locations in connection with wall 52, and it will be understood that these locations are preferably carefully ascertained high impedance regions for the modes or components to be suppressed.

At 70, 70a and 70b I have indicated wave attenuators in the form of quarter-wave spoiler tubes opening through the wall 52, and it will be understood that these are of the same nature as the spoiler tubes described in connection with the apparatus of Figure 1. Each has a length one-quarter wave length of the particular wave to be suppressed, and each is located at a high impedance point for this wave. As explained in connection with Figure 1, the spoiler tubes supply reflected waves at 180° out of phase with the incident wave, and hence tend to neutralize the incident wave. The spoilers also absorb sound wave energy by reason of gas turbulence owing to high gas particle velocity along the necks.

At 71 I have indicated a Helmholtz resonator mounted in an opening through duct wall 52, and it is to be understood that this Helmholtz resonator is effective in suppressing, by resonant absorption, a sound wave of a certain frequency or frequency band, depending upon its dimensions. The Helmholtz resonator 71 is accordingly chosen of a dimension to be responsive to an unwanted wave frequency component, and its effect is to suppress such component. It is further to be understood that the Helmholtz resonator type of attenuator is also preferably located at a high impedance range in the combustion chamber for the wave component on which it is to act.

At 72 I have indicated another type of sound wave attenuator (see also Figure 3), consisting of a chamber 73 filled with sound wave absorptive material, such as tungsten fibers, copper fibers, silica fibers, fiber glass, etc. This chamber 73 has a reduced and screw-threaded neck portion 75 which is threaded into the duct wall 52, and the sound wave insulation material 74 is confined behind perforated wall 76. Sound waves inside the duct space 53 are enabled to communicate with the absorptive material 74 by entering through the neck 75 and passing through wall perforations 76a. Such a sound wave absorber as here disclosed may be predominantly responsive to certain principal wave frequencies but the response curve is relatively flat as compared to $\lambda/4$ spoilers, and the attenuator in this form is responsive to a broader frequency band, the band being largely determined by the area of the neck 75 and the volume of the attenuator cavity.

I have also illustrated in Figure 2 a sound wave attenuator in the form of a substantially exponential trumpet 80, whose large end or mouth opens through wall 52 inside duct space 53, and whose small end may be packed with sound absorbent material, such as indicated at 81. Sound waves entering the mouth of this trumpet are crowded in traveling toward the small end of the trumpet, and upon reaching the small end thereof, where their energy density is high, the sound wave energy is dissipated by frictional loss in the region of the absorptive material 81. I have found that the trumpet must have a slow enough taper to accept the longest wave length to be attenuated. This shape parameter is important.

Each of the above-mentioned attenuative devices is effective for the purposes in hand, and any one type may be used throughout, though I have here illustrated several illustrative forms used in combination. In each instance, the attenuator is preferably installed at a high impedance region for the wave component to be suppressed, as has already been explained; and in each instance, the attenuator is designed to be effective for the wave frequencies to be suppressed. The separate techniques to this end are understood in the acoustic art and need not be further detailed herein.

The jet engine incorporating the acoustic attenuators as thus described is under effective combustion control, the burning irregularities referred to hereinbefore being greatly curtailed or entirely eliminated. As earlier explained, it is not necessarily of advantage to kill all sound wave action, since some such action is actually highly beneficial to combustion. Accordingly, the attenuator devices are not installed to such extent as to kill all sound wave action within the combustion chamber, but only to kill such sound wave action as otherwise causes undue heating, vibration, fire blowout, etc. Also, as earlier explained, some modes or components of vibration may not be detrimental, and may actually be beneficial; and in such cases, the non-detrimental modes are not attenuated. That is to say, the attenuator devices are to be located only in high impedance areas for detrimental sound wave modes or components, and are to be avoided in high impedance regions for sound wave modes which are either not detrimental, or are beneficial. I have found that the final criterion, after such test procedures as probe-microphone investigation, is the service record of the engine correlated with number, location, and wave length response of attenuators.

The usual procedure is to excite the chamber in the cold state, with a loud speaker, and explore the standing wave patterns with a probe microphone. This reveals the wave length of the possible undesirable patterns. Of course the frequency of these patterns will be higher in the hot gases during actual combustion, because the speed of sound in hot gases is higher, but the wave lengths are fixed by the chamber dimensions. Frequency times wave length equals the speed of sound. The important point is that the attenuators can be designed to have the desired wave length response.

The next simple step can then be to apply attenuation successively to each of the few possible sound wave patterns during actual engine operation, and note the engine performance and life.

Figure 4 shows a rocket jet engine equipped with the provisions of the present invention. The engine is shown to have an external housing 90, and an interior wall 91, with a coolant space 92 therebetween, the two walls being shaped to form reaction chamber 93, and nozzle 94. Fuel spray nozzles 95 and oxidizer spray nozzles 96 discharge into chamber 93, in conventional fashion. Such a rocket is particularly subject to destructive acoustic wave phenomenon, which frequently exhibits itself by excessive heating, even to actual melting of the walls of the rocket. The phenomenon is commonly referred to as "screaming," and when the rocket gives forth the characteristic scream, and immediately fails, it is found, upon examination, to have melted its housing walls. I have determined that this surprising behavior is owing to sound wave action induced by the combustion. The sound waves acting along the walls of the chamber multiply the rate of heat transfer from the combustion gases to the walls, and the heat tolerance of the walls is exceeded to the point that melting is commonplace.

The invention provides means for preventing this phenomenon by suppressing sound wave action in the combustion chamber, and in the illustrative embodiment, I employ a Helmholtz resonator 100 having a neck opening inside the rearward end of the chamber. This resonator is designed to be responsive to, and to attenuate, or destroy, the sound wave frequency pattern which has been determined to be the source of trouble.

In the embodiment of Figure 4, the fuel supply pipe connects into jacket space 92 at the end of nozzle 94, and fuel flows rearwardly, relative to jet flow, through said space to serve as the coolant for the engine. The outside housing 90 has a rearward extension 90a spaced outside the resonator, and the fuel travels rearwardly in the intervening space to outlet pipe 104, which leads to fuel nozzles 95. The oxidizer is supplied to nozzles 96 by pipe 105 and ring 106.

While I have shown the rocket engine of Figure 4 to be equipped with a sound wave attenuator in the form of a Helmholtz resonator, it will of course be understood that any other type of attenuator suitable to the problem may be substituted within the scope of the invention.

Figure 5 shows a modification of a portion of Figure 4, the attenuator, designated here by numeral 120, being in the nature of a detachable "trumpet" having a screw-threaded stem 121 connected into a threaded opening 122 in the head end of the rocket. The coolant jacket 123 surrounds the opening 122, and fuel supply pipe 124 leads therefrom to the fuel nozzles. The attenuator 120 has a substantially exponential horn-shaped cavity 125 opening into the head end of the reaction chamber, and the small end of this cavity preferably has packed therein sound absorption material such as fiber glass, indicated at 126. Behind screwthreaded stem 121, the attenuator has an enlarged body section 127, conveniently provided with hexagonal wrench faces (not shown), and outside section 127 is a stem 128 containing the small end of the cavity, the stem 128 preferably being furnished with head radiating fins 129.

Such an exponential horn-shaped cavity will respond to and attenuate a band of sound frequencies, depending upon its dimensions, and may of course be selected to respond to an offensive frequency band found within the reaction chamber of the rocket. An advantage of the embodiment of Figure 5 is the ready interchangeability of the attenuators, whereby different sized cavities may readily be tried.

Figures 6 and 7 show a conventional ram jet equipped with the provisions of the present invention. The exterior housing or shell 130 has at its forward end the usual tapered, sharp edged nose 131, and at its rearward end the discharge orifice 132, the shell forming an open ended duct for air and products of combustion. Annularly spaced inside the forward portion of the shell is the familiar center pod 133, and between the tapering forward end of this pod and the shell nose 131 is formed the familiar supersonic and sonic diffuser 134.

Air taken in at the nose has its velocity reduced and its pressure increased in passing through the diffuser portions of the duct, and at and beyond the rounded rearward end of the pod, where the cross-sectional area of the duct is markedly increased, the velocity is further reduced, and pressure correspondingly increased. Just behind the pod, in this locality of increased pressure, is the combustion region 140, to which fuel is discharged as by nozzles 141 fed through a pipe 142 from a fuel tank 143 inside the pod. A flame holding grille 146 is positioned just beyond the fuel nozzles, and a conventional fuel igniter is indicated at 147.

In the usual operation of such a ram jet, fuel-air mixture is burned at the high pressure combustion region 140, and the products of combustion and remaining air flow rearwardly and are jet discharged through tail orifice 132. Combustion irregularities are made manifest in various ways, including heating, noise, vibration, and interference with the shock wave at the nose. These are again intimately connected with sound waves and wave patterns within the duct, and by attenuation of the damaging wave frequencies and components, these manifestations are materially reduced or entirely eliminated.

As in earlier embodiments, I find it best to preliminarily ascertain the wave patterns, as by probing with a microphone while the engine is running, after which acoustic resonators for the offensive frequencies are installed at the high impedance regions of the wave patterns detected. Control or attenuation of these wave patterns is best achieved near the center of the duct, and I prefer to install the attenuators in the center section, preferably in the rear end of the pod, this being normally a high impedance region for the wave pattern. In the present exemplification, I show Helmholz resonators 150 mounted in the rear end of the pod, their necks opening through the curved rearward end of the pod. These resonators are of course dimensioned to resonate at and thereby to attenuate the offensive wave frequencies. It may often be desirable to so design and locate them as to avoid elimination of sound wave frequencies and patterns not found to be offensive, since these are often actually helpful to combustion, as already explained. Helmholtz resonators are nicely applicable to this selective application of attenuation to the various sound wave frequencies and directional components, some harmful and some useful, though of course other types of attenuators may be used.

The drawings and descriptions are illustrative of the invention in several applications, but it will be understood that various other applications, designs, and arrangements are possible within the scope of the invention as defined by the appended claims.

I claim:

1. The method of suppressing detonation of fuel and oxidizer during chemical reaction under high average pressure in the combustion chamber of a jet engine having a sound wave pattern which is connected acoustically to said reacting mixture of fuel and oxidizer that includes: acoustically preventing a substantial portion of sound waves of determinable frequency content from occurring in the gas-filled combustion chamber by providing an attenuating environment for said portion, while maintaining said combustion chamber gases in the region upstream from the jet discharge effectively isolated from outside atmospheric pressure.

2. In a jet flow engine, the combination of: a jet discharge nozzle, a combustion chamber which supplies heat energy to the jet flow, and acoustic attenuation means operatively combined with said combustion chamber and having frequency response for a characteristic acoustic pressure cycle pattern generated in said combustion chamber by detonation, said attenuation means being arranged in pressure wave communication with detonation pressure variations in said chamber upstream from said nozzle and with the attenuation means being subjected to said pressure variations so as to be part of the acoustic environment thereof, and wall means in combination with said attenuation means for isolating said attenuation means from outside atmospheric pressure, all in such manner as to effect substantial reduction in the amplitude of the detonation generated acoustic pressure cycle pattern occurring within the combustion chamber upstream from the jet discharge thereof.

3. Apparatus according to claim 2 in which the acoustic attenuator means is a resonant absorber comprised of a Helmholtz type chamber having frequency response for said acoustic pressure cycle and being coupled to said combustion chamber gases.

4. Apparatus according to claim 2 in which the acoustic attenuation means is an exponential extension of the combustion chamber, which exponential extension has a closed termination.

5. Apparatus according to claim 2 in which said attenuation means is a porous acoustic absorbing material embodied within a cavity containing a portion of the confined combustion chamber gases.

6. Apparatus according to claim 2 in which said jet flow engine is a rocket and wherein said attenuation means is located in the head end region of the rocket combustion chamber.

7. Apparatus according to claim 3 in which said jet flow engine is a ram-jet and wherein said attenuation means is located near the transition region common to the diffuser section and to the combustion region.

8. Apparatus according to claim 2 in which said combustion chamber has a curved wall and in which said attenuation means is located near to said wall so as to attenuate an acoustic pattern guided by said wall.

9. Apparatus according to claim 2 in which said attenuation means is a quarter wavelength pipe coupled to said chamber and closed at the outer end.

10. Apparatus according to claim 2 in which said jet flow engine is a gas turbine employing jet flow from the combustion chamber to the turbine blade region and in which said attenuation means is coupled to and frequency responsive to the combustion chamber acoustic pattern of combustion vibration.

References Cited in the file of this patent
UNITED STATES PATENTS

| | | |
|---|---|---|
| 2,224,130 | Arnold | Dec. 10, 1940 |
| 2,240,161 | Mueller | Apr. 29, 1941 |
| 2,366,416 | McCollum | Jan. 2, 1945 |
| 2,488,218 | McCollum | Nov. 15, 1949 |

FOREIGN PATENTS

| | | |
|---|---|---|
| 176,838 | Great Britain | Mar. 6, 1922 |